United States Patent [19]

Welborn, Jr.

[11] Patent Number: 5,191,052

[45] Date of Patent: Mar. 2, 1993

[54] COPOLYMERS OF ETHYLENE AND 1,3-BUTADIENE

[75] Inventor: Howard C. Welborn, Jr., Houston, Tex.

[73] Assignee: Exxon Chemical Patents Inc., Linden, N.J.

[21] Appl. No.: 609,325

[22] Filed: Nov. 2, 1990

Related U.S. Application Data

[63] Continuation-in-part of Ser. No. 944,385, Dec. 19, 1986, abandoned, which is a continuation-in-part of Ser. No. 747,615, Jun. 21, 1985, abandoned.

[51] Int. Cl.$^5$ .................... C08F 236/06; C08F 4/602
[52] U.S. Cl. ...................................... 526/339; 526/160
[58] Field of Search .................................... 526/339

[56] References Cited

U.S. PATENT DOCUMENTS

| 3,803,106 | 4/1974 | Hayashi et al. |
| 4,366,296 | 12/1982 | Kitagawa et al. |
| 4,404,344 | 9/1983 | Sinn et al. |
| 4,542,199 | 9/1985 | Kaminsky et al. |

FOREIGN PATENT DOCUMENTS

| 0035242 | 9/1981 | European Pat. Off. |
| 0069951 | 1/1983 | European Pat. Off. |
| 2608863 | 8/1977 | Fed. Rep. of Germany |
| 2608933 | 8/1977 | Fed. Rep. of Germany |
| 1112698 | 5/1968 | United Kingdom |

OTHER PUBLICATIONS

Boor, Ziegler-Natta, Catalysts and Polymerizations, Academic Press, Inc. N.Y. (1979) pp. 53-54, 130-146, 148, 149.

Fineman, M. and Ross, S. D., "Linear Method for Determining Monomer Reactivity Ratios in Copolymerization", J. of Polymer Sc., vol. V, 1950, 259-262.

Mayo, F. R. and Walling, C., "Copolymerization", Chemical Reviews, 1950, 191-287.

*Primary Examiner*—Edward J. Smith
*Attorney, Agent, or Firm*—John F. Hunt; Robert W. Mulcahy

[57] ABSTRACT

Ethylene 1,3 Butadiene copolymers having in their structure cyclopentane rings connected in a trans 1,2 position. The ethylene copolymers of the invention may be formed from polymerization of ethylene and 1,3 butadiene and preferably have a predominance of the copolymer units formed as trans 1,2-cyclopentane, the remainder of the 1,3 butadiene comonomer being incorporated as the noncyclic.

8 Claims, 5 Drawing Sheets

COPOLYMERS OF ETHYLENE AND 1,3-BUTADIENE

CROSS REFERENCE

This is a Continuation-In-Part of U.S. patent application, Ser. No. 944,385, filed on Dec. 19, 1986, now abandoned which application is a Continuation-In-Part of U.S. patent application Ser. No. 747,615, filed June 21, 1985, and now abandoned.

BACKGROUND OF THE INVENTION

The present invention relates to particular ethylene copolymers having relatively uniform crystallinity and residual unsaturation, and formed by the copolymerization of ethylene and 1,3 butadiene (diolefin) comonomer in the presence of a metallocene/aluminoxane (alumoxane) catalyst. According to the present invention ethylene-butadiene copolymers are obtained having high molecular weight, a lower degree of crystallinity than the high ethylene content ethylene-butadiene co-polymers of the prior art, and a relatively high degree of unsaturation. The ethylene-butadiene copolymers of the invention are characterized by improved clarity, toughness and lower unsaturation than ethylene butadiene copolymers of the prior art.

The present invention is concerned with unsaturated, crystalline copolymers comprising macromolecular polymer chains made up of copolymerized units of ethylene and butadiene in which the butadiene is incorporated on the backbone in the form of trans 1,2 cyclopentane. It is well known that 1,3 butadiene and ethylene may be co-polymerized with a conventional Ziegler catalyst to form the unsaturated 1,4 (cis and trans) and the unsaturated 1,2 configurations (vinyl branch on the chain backbone). The object of the present invention is to provide new, unsaturated copolymers of ethylene and 1,3 butadiene in which a portion of the diolefinic comonomer is incorporated as a bulky, saturated cyclic unit. In these new copolymers, a portion of the units derived from the 1,3 butadiene exist in the copolymer in the form of cyclopentane units, and the remainder of the units derived from the 1,3 butadiene exist in the form of the 1,4 (cis and trans) and 1,2 configurations, the unsaturation being retained.

Additionally, prior art ethylene copolymers are generally characterized by relatively inefficient use of comonomer moieties along the polyethylene chains. The distribution of the comonomer along the chain is very important in determining both the efficiency of use of the comonomer and the resulting properties of the polymer, especially with respect to crystallizability of the polymer. The prior art ethylene copolymers tend to have a high degree of clustering or contiguity of the comonomer moieties along the polyethylene chain. That is, the comonomer units are adjacent or clustered along the chain resulting in inefficient use of the comonomer since only a single polyethylene chain crystallinity interruption results between adjacent polyethylene chains when several comonomer units are contiguous and clustered together. This has important implications in the total amount of comonomer required to achieve a certain level of crystallinity that is, in the case of inefficient use more comonomer is required to achieve a desired crystallinity. Also, it is often disadvantageous and costly to require unneeded portions of comonomer, especially when dealing with less available and more expensive diene comonomers such as 1,3-butadiene.

Additionally, the need to use a higher portion of comonomer also tends to force the comonomer into low molecular weight, high comonomer content ends of the molecular weight distribution.

As indicated, the ethylene-1,3-butadiene copolymers of the present invention are highly unsaturated curable elastomeric hydrocarbon copolymers. These copolymers are not only outstanding elastomers in their own right, but they are valuable intermediates for the preparation of adhesives, sealants and the like and yield useful products as components in blends. To enhance these useful features of the instant ethylene-1,3-butadiene copolymers, it has been found desirable to achieve relatively homogeneous distribution of the unsaturated diene comonomer across the polyethylene copolymer chains.

It has now been found that new 1,3-butadieneethylene copolymers can be prepared by co-polymerizing ethylene and 1,3 butadiene in the presence of metallocene/alumoxane catalysts. The copolymers are found to be unsaturated and possess certain broadened molecular weight as well as comonomer sequencing and distribution characteristics.

SUMMARY OF THE INVENTION

The present invention is directed to new ethylene/1,3-butadiene copolymers, especially those having a concentration of cyclopentane structures as disruptions in the polyethylene backbone. Specifically, the present invention is directed to new ethylene copolymers having cyclopentane rings in the ethylene chain, connected in the trans configuration in the 1 and 2 positions on the ring as follows:

The new ethylene copolymers additionally contain 1,3-butadiene incorporated into the polymer backbone as unsaturated units in the normal 1,2 and trans and cis 1,4 addition. The present copolymers are distinguishable over prior art copolymers in the novelty of the cyclized 1,3-butadiene comonomer incorporation into the copolymer and the unique sequencing distribution of the comonomer.

In accordance with the present invention, a new metallocene/alumoxane catalyst is provided for olefin polymerization which catalyst can be usefully employed for the production of low, medium and high density polyethylenes and copolymers of ethylene with alpha-olefins having 3 to 18 or more carbon atoms and-/or diolefins having up to 18 carbon atoms or more. The new catalyst provided in accordance with the preparation of the copolymers of this invention, comprises the reaction product of at least one metallocene and an alumoxane in the presence of a support material thereby providing a supported metallocene-alumoxane reaction product as the sole catalyst component. The supported reaction product will polymerize olefins at commercially respectable rates without the presence of the objectionable excess of alumoxane as required in the homogenous system.

The metallocenes employed in the production of the reaction product on the support are organometallic coordination compounds which are cyclopentadienyl derivatives of a Group 4b, 5b, or 6b metal of the Periodic Table (56th Edition of Handbook of Chemistry and Physics, CRC Press [1975]) and include mono, di and tricyclopentadienyls and their derivatives of the transition metals. Particularly desirable are the metallocene of a Group 4b and 5b metal such as titanium, zirconium, hafnium and vanadium. The alumoxanes employed in forming the reaction product with the metallocenes are themselves the reaction products of an aluminum trialkyl with water.

The alumoxanes are well known in the art and comprise oligomeric linear and/or cyclic alkyl alumoxanes represented by the formula:

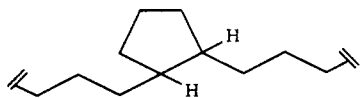

$$R-(Al-O)_n-AlR_2 \text{ for oligomeric, linear alumoxanes and} \quad (I)$$
$$\phantom{R-(}|\phantom{Al-O)_n-AlR_2}$$
$$\phantom{R-(}R$$

$$(-Al-O-)_m \text{ for oligomeric, cyclic alumoxane,} \quad (II)$$
$$\phantom{(-}|$$
$$\phantom{(-}R$$

wherein n is 1–40, preferably 10–20, m is 3–40, preferably 3–20 and R is a $C_1$–$C_8$ alkyl group and preferably methyl. Generally, in the preparation of alumoxanes from, for example, aluminum trimethyl and water, a mixture of linear and cyclic compounds is obtained.

The alumoxanes can be prepared in a variety of ways. Preferably, they are prepared by contacting water with a solution of aluminum trialkyl, such as, for example, aluminum trimethyl, in a suitable organic solvent such as benzene or an aliphatic hydrocarbon. For example, the aluminum alkyl is treated with water in the form of a moist solvent. In a preferred method, the aluminum alkyl, such as aluminum trimethyl, can be desirably contacted with a hydrated salt such as hydrated ferrous sulfate. The method comprises treating a dilute solution of aluminum trimethyl in, for example, toluene with ferrous sulfate heptahydrate.

DESCRIPTION OF THE PREFERRED EMBODIMENTS

Figure 1:
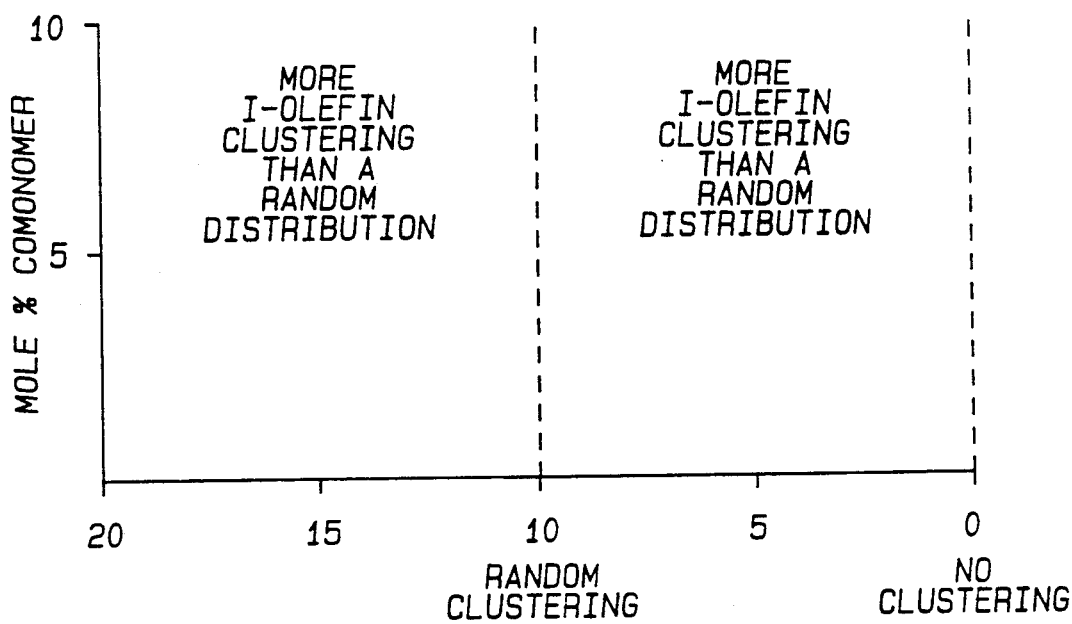
FIG. 1 is a graphic and verbal depiction of the concept of cluster index.

One embodiment of the present invention is a 1,3-butadiene-ethylene copolymer composition comprising trans 1,2-cyclopentanes in the backbone in the following configuration:

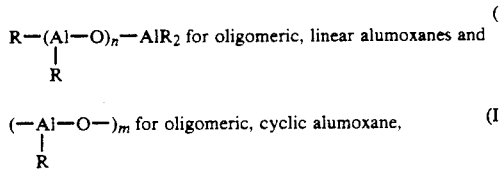

Another embodiment of the present invention is a copolymer resulting from the polymerization of ethylene and at least one other polymerizable comonomer comprising 1,3-butadiene, said copolymer incorporating in its structure at least about 1 mol percent of said at least one polymerizable comonomer and having a cluster index of about 9 or less.

Still another embodiment of the present invention is a copolymer composition of ethylene and butadiene, said copolymer having a molecular weight distribution (Mw/Mn) of about 3.0 or less.

Yet another embodiment of the present invention is a method for preparing copolymers of ethylene and butadiene comprising carrying out the polymerization in the presence of a metallocene/alumoxane catalyst system and forming an uncrosslinked ethylene/butadiene copolymer composition.

And still yet another embodiment of the present invention is a copolymer resulting from the polymerization of ethylene and at least one other polymerizable comonomer comprising butadiene, said copolymer having a composition distribution wherein at least about 55 weight percent of the copolymer molecules have a comonomer content within 50% of the median comonomer content in mole percent, of said copolymer.

The term copolymer is intended to include co-, ter-, and higher interpolymers of ethylene, 1,3-butadiene; and optionally other polymerizable comonomers. The copolymers have, in the ethylene backbone, a plurality of cyclopentane rings connected at adjacent carbons at the trans-1,2 position. The copolymers of the invention will also include incorporation of unsaturated units of butadiene in the linear 1,4 (cis and trans vinylene unsaturation) configuration as well as the well-known 1,2 configuration (vinyl branch on the chain backbone). Preferably the copolymers are predominantly (50–100%) cyclopentane incorporation and the remainder (0–50%) 1,4 or 1,2 incorporation of the butadiene. The 1,4 incorporation is usually greater than the 1,2 incorporation of butadiene in the polymers of the invention.

The copolymers of the invention preferably have at least about 10 percent, more preferably at least about 50 percent of the butadiene incorporated in the form of the cyclopentane rings.

The use of butadiene in copolymerizing (or terpolymerizing or higher) ethylene tends to produce polymers of higher molecular weight compared to comparable processes with an alpha olefin.

The present copolymers are further characterized in having a homogeneous composition in terms of the sequencing of the 1,3-butadiene comonomer. In these unsaturated copolymers the incorporated units derived from the starting 1,3-butadiene monomer are distributed in a noncontiguous manner resulting in enhanced homogeneity. This homogeneity of the copolymers is confirmed by the fact that the instant unsaturated copolymers produce copolymers which can be satisfactorily employed as unsaturated cross-linkable intermediates notwithstanding the lower unsaturation compared to conventional ethylene 1,3-butadiene copolymers.

This cross-linking characteristic is possible because of the 1,2 and cis and tran 1,4 addition of the 1,3 butadiene which incorporated units contain the functional double bond and because of the homogeneous distribution of the incorporated comonomer units in the macromolecules caused by the non-contiguous sequencing of the comonomer in the preparation of the copolymer.

According to the invention the butadiene is incorporated in the copolymer (or higher polymer) with two adjacent carbon atoms of a cyclopentane ring in the backbone (no unsaturation). Some of the butadiene incorporates in the trans 1,4 configuration forming a straight backbone with one unsaturation. Some of the butadiene may also incorporate into the copolymer in the cis 1,4 configuration also forming a straight backbone with one unsaturation (C=C double bond) but having both of the hydrogens associated with the double bond carbons on the same side of the double bond. Finally, some of the butadiene, usually a very small to nil portion, may incorporate in the 1,2 configuration leaving a pendant vinyl group as an unsaturated branch on the saturated carbon chain. Therefore the copolymer can be formed with a sufficient amount of residual unsaturation in the backbone or in side chains for eventual use in special applications such as crosslinking or chemical modification.

The ethylene copolymers of the invention have improved properties resulting especially from the more efficient use of diene comonomer in controlling the crystallizability of the polymer. That is, the efficient use of the diene comonomer comprises an improved isolation of the comonomer molecules along the polyethylene chains as not previously achieved for such ethylene copolymers. Accordingly, the polymers of the present invention not only have especially good application for those uses previously employing such polymers, but also have excellent overall physical properties marking a significant improvement over those materials previously available. The improved properties of the invention result from the isolated dispersion of the diene comonomer and other comonomers along the sequence of the polymer molecule of the invention.

Another preferred embodiment copolymer of the present invention has a distribution wherein more than 55 weight percent of the copolymer molecules are within 50 percent of the median comonomer content in mole percent, said copolymer being formed by polymerization in the presence of a catalyst system comprising a metallocene of a metal of Group IVB, VB, and VIB of the Periodic Table and an alumoxane or reaction product thereof.

The copolymer products of the present invention comprise batchwise or continuously produced bulk polymer compositions having the properties and characteristics described herein. No such compositions have heretofore been discovered. That is, the entire/unmodified polymerization product has the advantageous properties.

The copolymer compositions of the invention may be prepared from the polymerization of ethylene and at least one comonomer. The at least one comonomer comprises, that is always includes some (or all) of the 1,3-butadiene.

The 1,3-butadiene comonomers incorporated in the polymers of the invention may be in small or large quantity relative to the amount of ethylene in the polymer. In one embodiment of the invention, the polymers of the invention contain at least a minimum of about 1 mole percent total comonomer based on the moles of ethylene and comonomers, so as to provide wide dispersion of the comonomers in the polymer product composition. This generally limits the density to a number below 0.930 g/cc, preferably below 0.92 g/cc depending on the copolymers chosen and the method of incorporation. Thus, where only a two component polymer composition is formed from ethylene and the diene, at least about 1 mole percent diene units and no more than about 99 mole percent ethylene units are present. For terpolymers and higher interpolymers of the invention, only about 0.1 mole percent or more, preferably about 0.2 mole percent or more, more preferably 1 mole percent or more of the diene need to be incorporated so long as the total incorporation of comonomers [diene and other(s)] is at least about 1 mole percent for this embodiment.

Despite incorporation of at least about 1 mole percent comonomer units in one embodiment of the polymer compositions of the invention the polymers nevertheless have a low cluster index and preferably other characteristics described herein. The total comonomer content of the polymers of the invention may be the predominant portion of the polymer. Preferably, especially for solid polymers, the ethylene units are the predominant component on a molar basis.

In one preferred embodiment of the present invention the polymers of the invention have improved properties attributable to the more uniform content of diene and other comonomers among the polymer molecules.

In contrast to the prior art polymers, the copolymers, terpolymers, and other interpolymers of the present invention exhibit very little clustering of the comonomer molecules along the polyethylene chain both with respect to the diene comonomer and any other polymerizable comonomer formed in the polyethylene chain. As a result, the use of comonomers in forming the copolymers of the invention is very efficient in controlling crystallizability, wards against formation of high comonomer content/low molecular weight ends, reduces cost, and improves properties.

In a preferred embodiment of the present invention, the copolymers of the invention have very narrow composition distribution of comonomer. That is, the copolymers have much more uniform distribution of comonomer among the molecules thereby largely avoiding the problem presented by broad composition distribution resins.

In another preferred delineation of the invention, the copolymers of the invention have improved properties resulting from the more consistent size of polymer molecules not achieved in the prior art. This aspect of the more preferred embodiment is generally referred to as a lower molecular weight distribution or ratio of the weight average molecular weight to number average molecular weight of the polymer material.

Also in this preferred embodiment of the present invention, the copolymers of the invention exhibit relatively narrow molecular weight distribution. That is, they have a relatively low ratio of weight to number average molecular weight. In other words, the concentration of very high molecular weight molecules and very low molecular weight molecules is decreased over prior art polymers. The absence of the high molecular weight molecules reduces the tendency for orientation in fabrication processes and increases isotropic machine/transverse direction physical properties. The absence of low molecular weight molecules (low tail) in the copolymers of the invention reduces the tendency to form tacky surfaces and otherwise interfere with surface active agents in certain applications of the copolymers of the present invention.

Polymers of the prior art do not have the structure and corresponding properties of the polymers of the invention. That is, they lack the low cluster index for ethylene copolymers (including terpolymers and higher interpolymers) having therein at least about 1 mole percent comonomer units according to the invention. The absence of such structure is generally reflected in easily measured characteristics of the invention such as melting point temperature and the like. The prior art polymers also generally lack narrow molecular weight distribution and narrow comonomer distribution.

The polymers of the present invention are capable of being fabricated into a wide variety of articles, as is known for homopolymers of ethylene and copolymers of ethylene and higher alpha-olefins.

The polymers of the invention may vary in density in a broad range from essentially amorphous materials to highly crystalline materials. They may be liquids (such as for certain rubbers and lubricants and waxes) or solids.

The molecular weight of the copolymers of the invention may vary over a broad range. Preferably the polymers have a number average molecular weight of about 500 or higher, preferably 1000 or higher, more preferably 10,000 or higher. Typically, materials used for elastomers applications are either copolymers or terpolymers (often with propylene monomer) in the density range of about 0.86–0.87 g/cc. Typically, these polymers contain 30 weight percent or more of the comonomers and the balance ethylene. Frequently, the elastomers of the unsaturated polymers of the invention will have as much as 48 weight percent of the comonomer present.

The polymers of the present invention may also include plastomers in the density range of about 0.87–0.900 g/cc and containing from about 20–30 weight percent of comonomer. Also available in the polymers of the invention are the very low density polyethylene materials of density range 0.900–0.915 g/cc and having from about 10–20 weight percent comonomer present.

The polymers of the invention may be formed as a linear low density polyethylene type polymer in the density range of about 0.915 g/c to about 0.950 g/cc and containing from about 5–10 weight percent of the comonomers. The polymers of the invention may also be used in the form of high density polyethylene having a density of about 0.940 g/cc and above and containing up to about 5 weight percent comonomers. The unsaturated polymers of the invention may also form amorphous materials below a density of 0.86 g/cc including tackifier resins.

The polymers of the present invention have particularly advantageous properties because of their narrow molecular weight distribution, narrow compositional distribution, and their chain configuration having isolated comonomer units.

Sequence distributions, or the distribution of comonomer units along a polymer chain, in, e.g., linear low density polyethylenes is a factor affecting the cost of the polymer because it affects the amount of comonomer required to achieve a desired polymer density. If comonomer is efficiently incorporated, i.e., with little clustering of comonomer units, in a linear low density polyethylene, less comonomer is required to depress the density. Thus, the number of comonomer runs in a copolymer chain and the length of each run is significant in the structure of the polyethylene molecules and affects the physical properties of the polymer. The polymers of the present invention are marked by a relatively high number of single units of comonomer in the polymer chain relative to the number of units containing more than a single comonomer molecule in comparison to unsaturated polymers of the prior art.

The ethylene polymers of the invention are hereinafter described by their "cluster index". This index reflects the degree to which the polymers of the invention have individual comonomer units dispersed along the polyethylene chain, preferably in favoring isolation of individual units over groups of two or more units. Given a minimum level of comonomer, the unsaturated ethylene polymers of the present invention are especially noted for their efficient use of comonomer molecules by having more isolated comonomer molecules along the polyethylene chain and fewer clusters of molecules of the comonomer in the polyethylene chain. That is, the unsaturated polymers of the present invention tend to deviate from random comonomer distribution in the direction of fewer contiguous comonomer sequences. Thus, the cluster index permits a quantitative evaluation of the deviation from a random distribution of comonomer in the polymer chain.

In the cluster index description given herein, there are two reference points. The reference point 0 describes a polymer which has only isolated comonomer insertions without any contiguous comonomer units in a cluster; of course this describes pure homopolymers also. The second reference point is the number 10 describing an ethylene copolymer having comonomer distribution that is exactly random (Bernoullian) and thus containing a predictable amount of contiguous comonomer units. Any polymer having a cluster index value greater than 10 contains proportionally more contiguous comonomer sequences than predicted by the random distribution. Any polymer having a cluster index value between 0 and 10 is indicated to have fewer contiguous sequences than a random distribution polymer. These values are typically associated with the method of producing the polymer including the catalyst used and conditions of polymerization.

The cluster index comparisons are best made for polymers having comparable comonomer mole contents or densities. The measurement of the clustering of the comonomer along the polyethylene chain in a given polymer may be determined by a study using carbon 13 nuclear magnetic resonance spectroscopy ($C^{13}$ NMR) Using this tool for evaluation, the cluster index may be given as follows:

$$\text{Cluster index} = 10\,[(X)-(EXE)]/[2(X)^2-(X)^3]$$

where (X) is the mole percent of total comonomer molecules in the copolymer and EXE is the mole fraction of the triad segment of 3 monomer units containing ethylene-comonomer-X-ethylene. These concentrations are easily measured using $C^{13}$ NMR.

The basis for the cluster index is further explained and exemplified below by the following discussion and in reference to drawing FIG. 1.

Referring now to drawing FIG. 1 the cluster index may be derived as follows, using the reference point 10 as random clustering expected in a polymerization and the reference point 0 as that point for no clustering in a polymer (no units of more than one comonomer molecule contiguous). Accordingly, $$\text{Cluster index} = 10 - 10 \times \frac{[(EXE)_{observed} - (EXE)_{random}]}{[(X) - (EXE)_{random}]}$$

where "X" is the mole percent comonomer X in the ethylene copolymer and EXE is the corresponding triad configuration of a single comonomer molecule contiguous to two ethylene molecules (units).

The term (EXE)random serves as a reference point and its value can be calculated from any suitable statistical model. In this case the Bernoullian model was chosen. For the Bernoullian model $(EXE)\text{random} = [1-X]^2[X]$.

Thus, substituting this value of (EXE)random in the formula for cluster index above gives:

Cluster index = 10
$[(X) - (EXE)\text{observed}]/[2(X)^2 - (X)^3]$

Accordingly, it can be readily seen from drawing FIG. 1 that those polymers having more comonomer clustering than a random distribution appear to the left of the reference point 10 and those having less comonomer clustering than a random distribution appear between 0 and 10.

Figure 2:
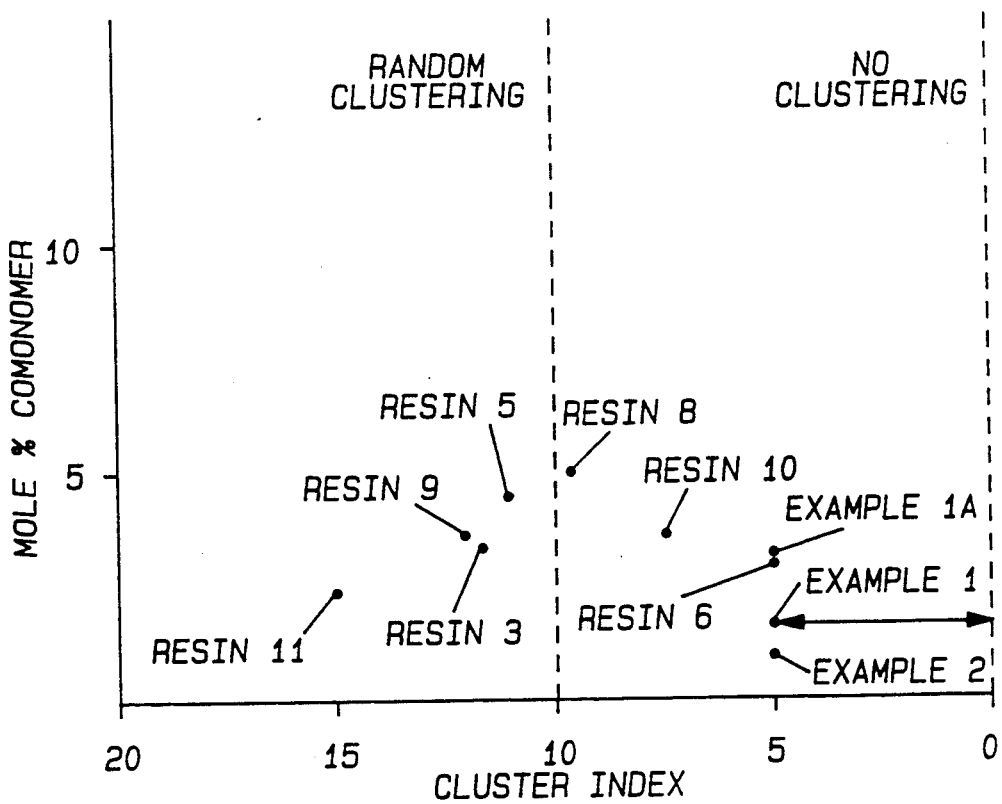
FIG. 2 is a plot of cluster index against mole percent comonomer for several commercial resins and the resins of the invention.

In FIG. 2, polymers are plotted according to their cluster index as described for FIG. 1 and using the vertical axis to plot mole percent of comonomer of the polymer samples. It is readily apparent from drawing FIG. 2 that those polymers of the invention have a reduced cluster index (for a given density comonomer content) over polymers of the prior art such as those commercial polymers plotted and appearing near or to the left of reference point 10 (random clustering). The technique of using the $C^{13}$ NMR to obtain the information for cluster index is known to the skilled artisan.

Also shown for comparison n FIG. 2 is the cluster index of Dowlex 2088 octene LLDPE copolymer (Resin 9), Dowlex 2517 octene LLDPE copolymer (Resin 10), and Union Carbide 7099 hexene LLDPE copolymer (Resin 11).

The cluster index improvement in the polymers of the invention versus polymers of the prior art is detectable at 1 mole percent comonomer content, readily discernable at 3 mole percent, and remarkable at about 10 mole percent or higher.

The above described cluster index may be considered to be of the first order or based on the total number of comonomer units less the isolated (EXE) comonomer units. A higher order cluster index can also be measured and calculated as based primarily on the occurrence of dimer segments (EXX) or (XXE) as observed. This measurement is somewhat more discriminating at low comonomer mole percents (about 3). Thus an EXX index may in like fashion be calculated as $$EXX \text{ Index} = 10 - 10 \frac{(EXX) \text{ observed} - (EXX) \text{ Bernoullian}}{(EXX) \text{ Bernoullian}}$$

Since (EXX) Bernoullian = 2 [E] [X]$^2$ and the (EXX) observed is based on both (EXX) and (XXE) units, readily measured by $C^{13}$NMR, the EXX index is readily achieved. For such index a totally random polymer is measured as 10, a totally dimerless polymer is 0 (no contiguous XX), and a polymer increasingly deficient in solitary units (EXE) will approach 20.

The EXX index is a second measure of polymer structure based directly on dimers and higher orders of contiguous (EXX or XXE) observed; it may be used independently or together with the cluster index (EXE) to distinguish polymers.

The chain backbone structures of the polymers of this invention were determined by the analysis of carbon-13 nuclear magnetic resonance (NMR) spectra, through assignment of the chemical shifts, line intensities, and multiplicities, and the analysis of the spectra of isotopically labelled polymers and from multiple NMR pulsing techniques. The carbon-13 peak assignments which distinguish the incorporated butadiene structures are given below.

1,3-Butadiene Incorporation Structure

| 1,3 Butadiene Enchainment | Chemical shift (ppm) | Carbon Identification |
|---|---|---|
| trans-1,2-cyclo-pentane ring | 46.5 | C1, C2 |
| | 24.4 | C4 |
| | 32.9 | C3, C5 |
| cis-1,2-cyclo-pentane ring | 43.3 | C1, C2 |
| | 24.4 | C4 |
| | 31.2 | C3, C5 |
| cis-1,4 enchainment (cis-vinylene unsaturation) | 27.3 | C1, C4 |
| | 129.9 | C2, C3 |
| trans-1,4 enchainment (trans vinylene unsaturation) | 32.8 | C1, C4 |
| | 130.8 | C2, C3 |
| 1,2 enchainment (vinyl side branch) | 37.5 | C1 |
| | 44.1 | C2 |
| | 143.2 | C3 |
| | 114.0 | C4 |

The infrared spectrum of the polymers can similarly be used to determine the relative amounts of butadiene incorporated to form the vinyl side branch unsaturation (910 cm$^{-1}$) and the trans-1,4-vinylene internal unsaturation (965 cm$^{-1}$).

The ethylene polymers of the present invention are preferably marked by a relatively narrow molecular weight distribution in comparison to prior art polymers. The molecular weights and molecular weight distributions were determined using Waters 150C Gel Permeation Chromatographic Instruments. These instruments were equipped with refractive index detectors operated at 145° C. and at a solvent flow rate of 1 milliliter per minute. The solvent used was ultra-high purity grade 1,2,4-trichlorobenzene obtained from Burdick and Jackson Company. Prior to use, the solvent was filtered through a 0.5 micron filter and stabilized with 120 ppm BHT. Three Waters styragel columns were used with nominal porosities of 500, 10,000, and 1,000,000 angstroms. Each polymers sample was dissolved in trichlorobenzene solvent at 145° C. to a concentration level of about 0.1 weight percent and thereafter filtered through a 0.5 micron porous metal filter. About 300 microliters of this solution was then injected into the gel permeation chromatograph. Analysis time was typically 45 minutes. Calibration of the instrument for molecular weight determination was accomplished with the use of narrow molecular weight distribution polystyrene standards obtained from Toyo Soda Manufacturing Company. Sixteen of the standards were used ranging in molecular weight from 525–5.2×10$^6$. Molecular weight distributions of these standards were listed at 1.0–1.15 as measured by the ratio of weight average molecular weight to number average molecular weight. These polystyrene molecular weight data were then converted to a polyethylene basis with the use of the Mark-Houwink equation and the use of the following constants:

for polyethylene $K = 5.17 \times 10^{-4}$, $a = 0.70$ for polystyrene $K = 2.78 \times 10^{-4}$, $a = 0.70$.

Figure 3:
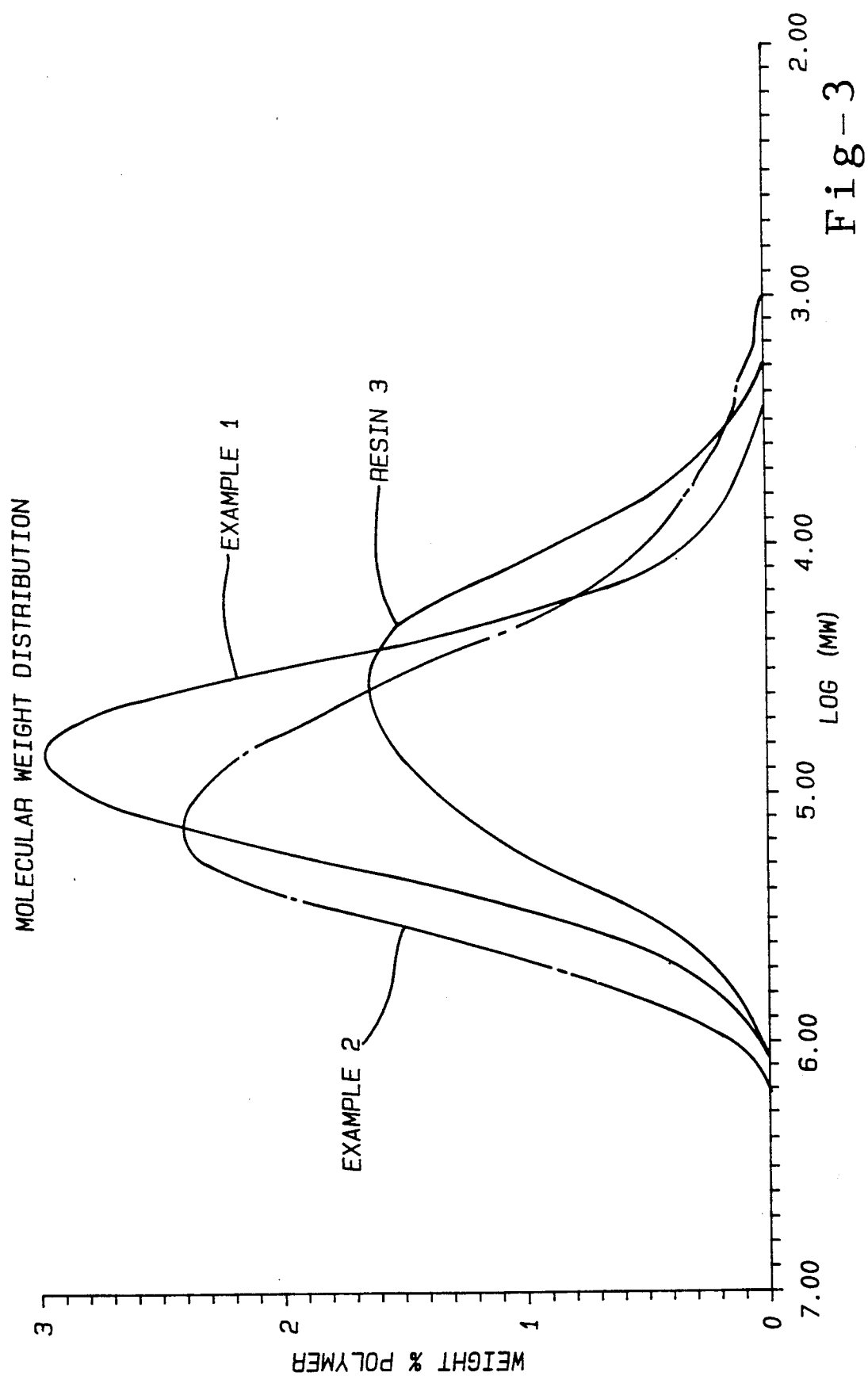
FIG. 3 is an overlay plot of the molecular weight distribution of the resins of the invention over that for commercial resin 3, plotted against weight percent comonomer content.

Each sample was run twice and the calculated results averaged to yield the molecular weight information reported. The molecular weight distribution of the resin of Example 1 below was plotted for comparison on the same plot with that for Exxon LL3001 linear low density polyethylene resin mole percent comonomer on a scale of the log of molecular weight versus weight percent of the polymer in the molecular weight range. As can be seen from drawing FIG. 3 the polymer of the invention has a strictly narrower molecular weight distribution than the commercially available linear low density polyethylene.

Figure 4:
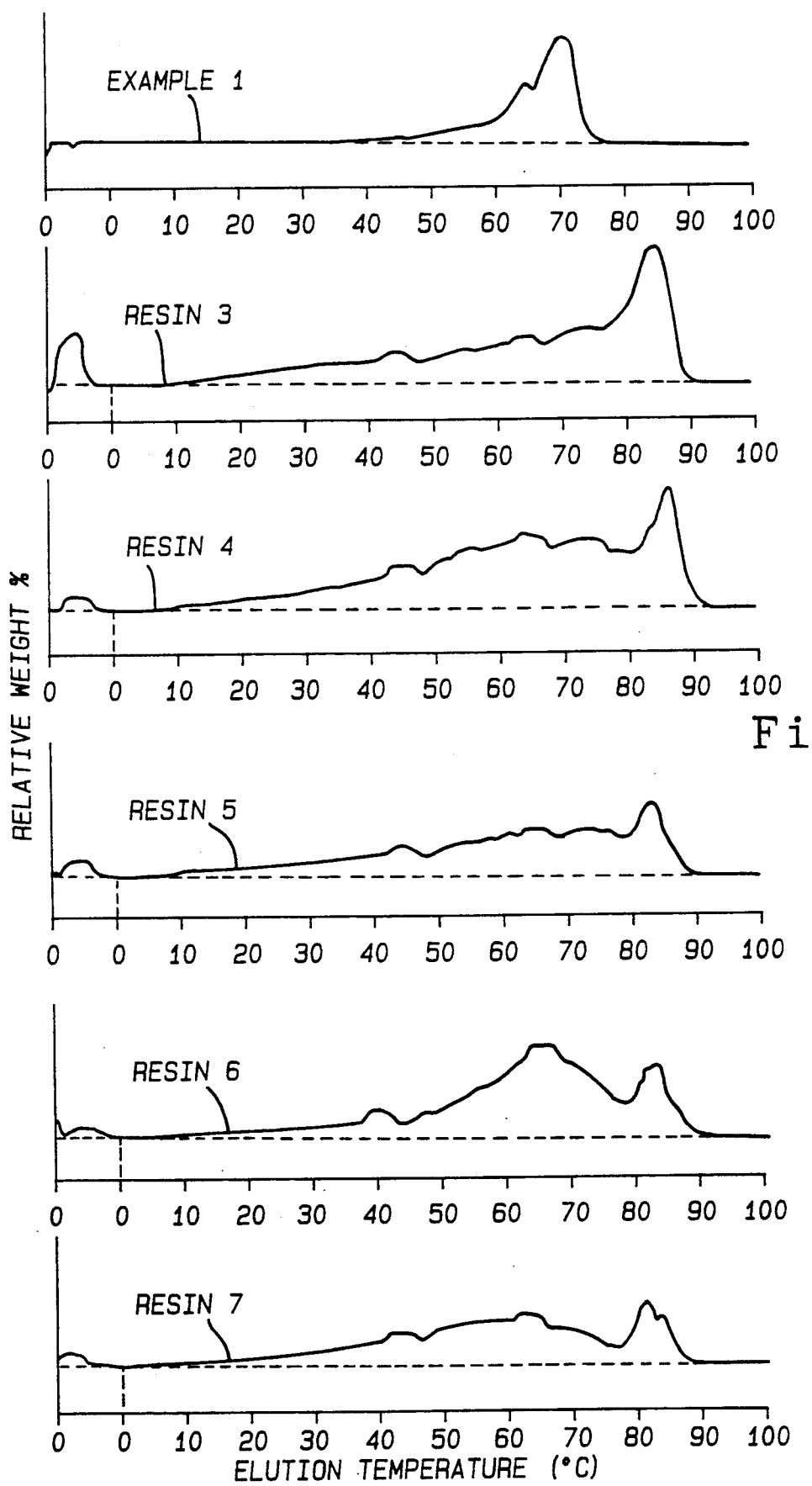
FIG. 4 is a plot of compositional distribution of comonomer in weight percent versus elution temperature for a resin of the invention and several commercial resins.

The polymers of the present invention preferably also have a narrow distribution of comonomer amongst molecules of the polymer in comparison to prior art polymers. For comparison, drawing FIG. 4 reflects the narrow distribution of the unsaturated polymer of Example 1 in comparison to the relatively broad comonomer distribution polymers of the prior art. In FIG. 4 the weight percent of copolymer (having a given comonomer content) is plotted against an elution temperature which directly reflects comonomer content. A better understanding of this preferred embodiment of the polymers of the present invention will be had by a review of FIG. 4 and the following discussion.

Crystalline copolymers may be fractionated by comonomer content over a temperature range from 0°–120° C. in tetrachloroethylene solvent. The compositions of the fractions of the solution are determined and a solution temperature versus composition calibration curve has been constructed based on the data obtained. Using this calibration curve, the temperature scale of the solubility distribution curve can be converted to a composition scale and a composition distribution curve is thus obtained as in drawing FIG. 4.

A machine has been assembled to automatically determine the solubility distribution curve of a crystalline copolymer. In the measuring instrument, a steel column is packed with small mesh glass beads and immersed in an oil bath whose temperature can be programmed over a temperature range from about 0° C.–150° C. The tetrachloroethylene solvent may be prevented from boiling by operating the instrument at about 3 atmospheres pressure under an automatic regulator. A weighed amount of sample, usually about 1.6 grams, is placed in a sample preparation chamber, sealed, and repeatedly evacuated and filled with argon. A metered volume of solvent is then pumped into the sample preparation chamber where it is stirred and heated to obtain a solution of about 1 percent concentration. A metered volume of this solution, usually about 100 cc is then pumped into the packed column which has been thermostated at a high temperature of usually at least about 120° C.

The polymer solution sample is subsequently crystallized by cooling the polymer in the column to 0° C. at a programmed rate of 5° C. per hour. The column was then maintained at 0° C. for at least an hour. Thereafter, the elution stage of the determination is started by pumping pure solvent through the column at a rate of 6 cc per minute. Effluent from the column passes through the reheated where it is heated to 120° C. before passing through an IR detector used to measure the absorbance of the effluent stream. The infrared absorption of the polymer carbon hydrogen stretching bands at about 2960 centimeter$^{-1}$ serves as a continuous measure of the relative concentration of polymer in the effluent. After passing through the infrared detector the temperature of the effluent is reduced to about 100° C. and the pressure is reduced to 1 atmosphere before passing the stream into an automatic fraction collector. In the elution stage, the pure solvent is pumped through the column set at 0° C. for one hour. This serves to flush polymer that has not crystallized during the crystallization stage out of the column so that the relative percent of uncrystallized polymer can be determined from the infrared trace. The temperature is then programmed upward at 10° C. per hour to 100° C. and at 20° C. per hour from 100° C. to 120° C.

The compositions of fractions obtained from the various polymers were determined by infrared spectroscopy. The IR compositions are obtained from the intensity of the 1378cm$^{-1}$ methyl band, the thickness of the sample, and a calibration curve based on samples whose compositions were determined independently by $C^{13}$NMR. No corrections for methyl polymer end groups was made in obtaining compositions from infrared data.

Figure 5:
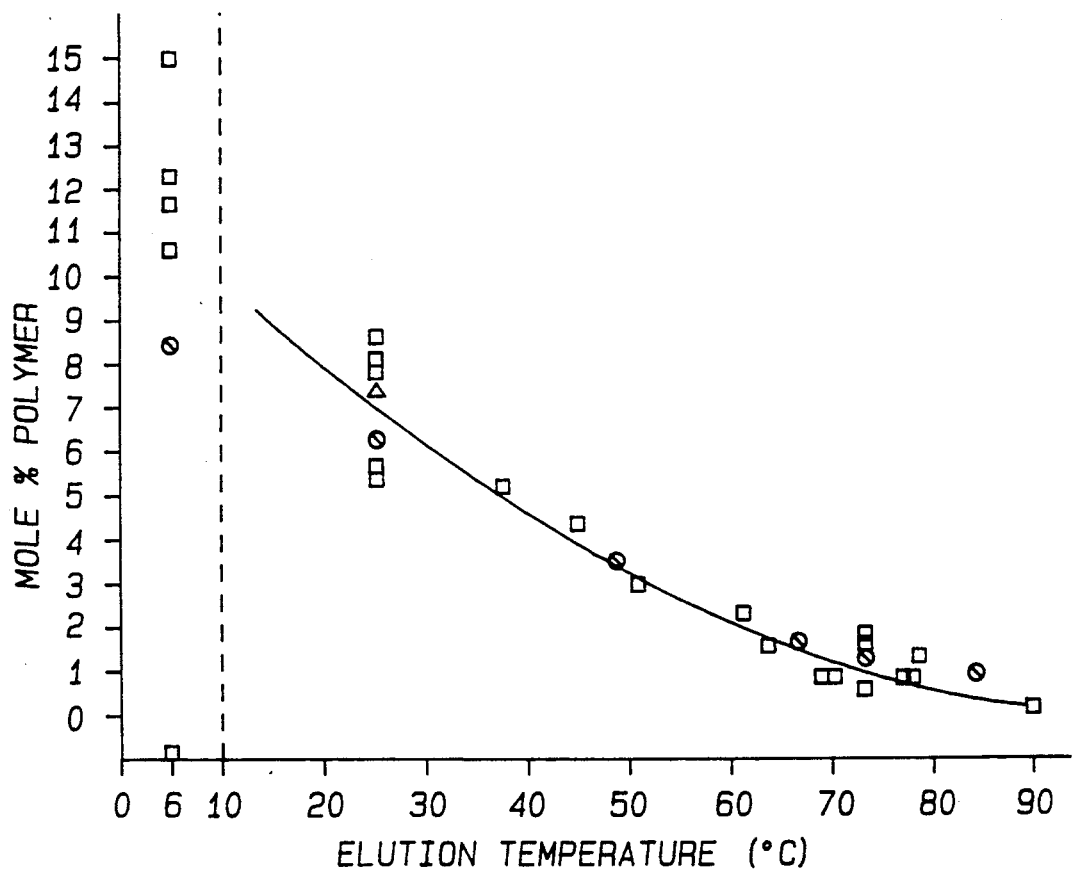
FIG. 5 is a plot evidencing the correlation of elution temperature against composition in mole percent comonomer (branches/1000 carbon atoms)

FIG. 5 is a plot of the elution temperature versus the comonomer content in mole percent comonomer (branches per 1000 carbon atoms) for the fractions of the sample. The curve "A" has been drawn through the points. Thus, curve A may be used as a correlation between elution temperature and composition of the polymer for temperatures greater than 0° C. The calibration curve is most accurate for fractions with number average molecular weights, $M_n \geq 10,000$ as determined by size exclusion chromatography.

As seen in drawing FIG. 4, samples of polymers tend to have a peak at about 0° C. elution temperature. This small peak represents the fraction of total polymer that is not crystallizable at the lowest temperature of the experiment (about 0° C.).

In summary, the device and procedure described provide a plot of relative weight percent of polymer versus elution temperature which in turn may be correlated to composition and mole percent comonomer (branches per 1000 carbon atoms) in the polymer chain. Accordingly, drawing FIG. 4 is an effective comparison of the comonomer distribution of the polymers of the invention to that for certain commercial polymers. As can readily be seen, the composition distribution of the polymer of the invention example is quite narrow in comparison.

In forming the polymers of the present invention it may be necessary to purify, or isolate the diene and other, optional comonomers of the invention in order to obtain incorporation thereof during polymerization. One such recommended technique is passing the comonomer, especially the diene, over alumina to remove extraneous materials.

Figure 6:
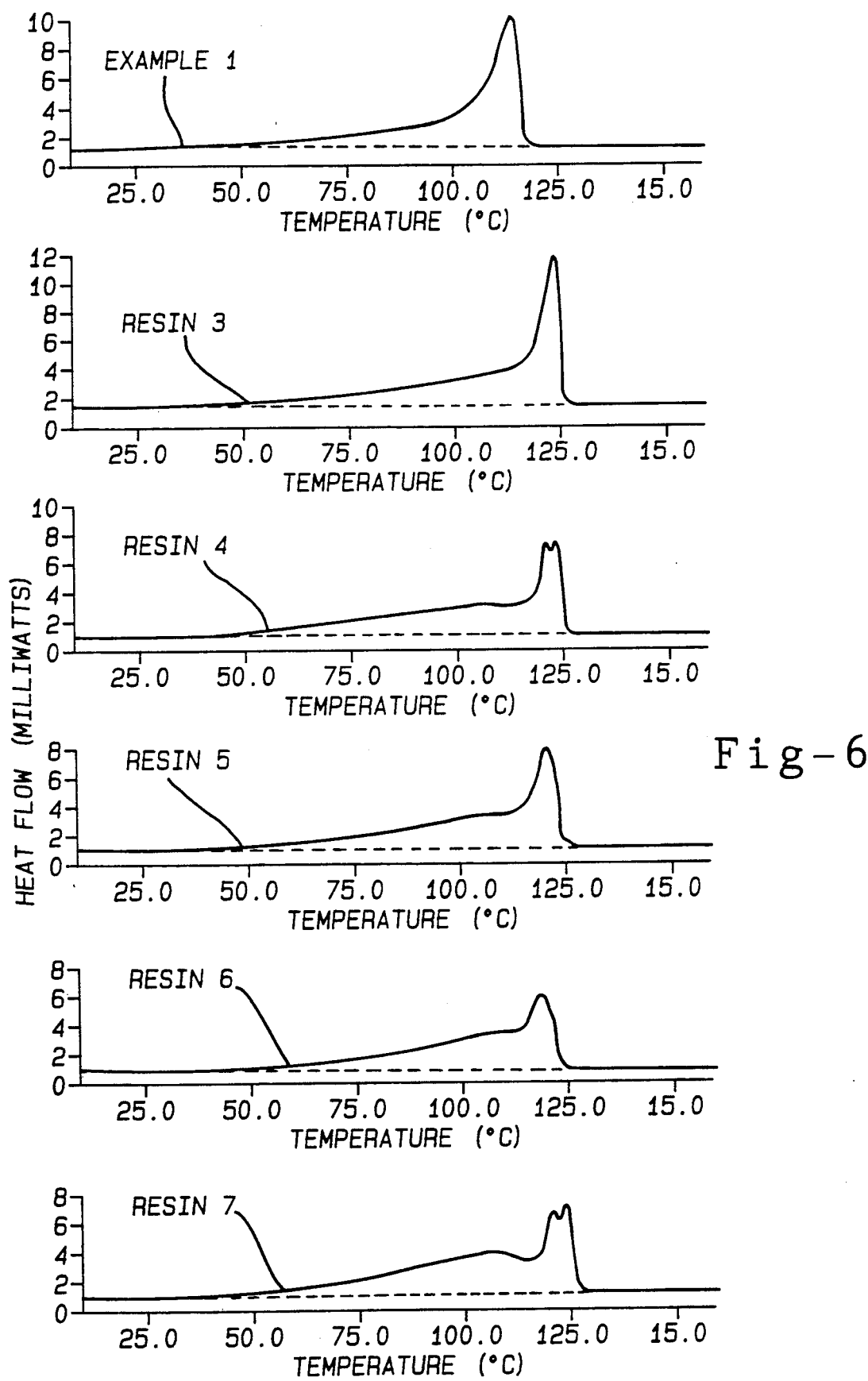
FIG. 6 is a plot of melting point DSC for the copolymer of the invention and some commercial polymers, showing the relative narrowness of the invention resin melting point.

FIG. 6 shows the melting point by differential scanning calorimetry (DSC) results for the resins of the invention in comparison to some commercial resins.

Melting point distributions were determined using a Perkin Elmer DSC-7 operated in the following fashion: About 5-6 mg of sample were heated to 160° C. and held at that temperature for 5 minutes. The sample was then cooled at 10° C. per minute to a temperature of 0° C. and reheated at 10° C. per minute. The melting distributions reported here were collected during this reheating at 10° C. per minute.

Concentrations of unsaturation in ethylene based polymers was determined by comparisons of IR spectra of brominated versus original polymer specimens utilizing the following band:

| | |
|---|---|
| vinylene | 965 cm$^{-1}$ |
| vinyl | 909 cm$^{-1}$ |
| vinylidene | 888 cm$^{-1}$ |

Various analyses of the copolymers of the invention and polymers formed by the method of the invention disclose that such copolymers have a significant predominance of ring addition of the butadiene versus 1,2 addition which can lead to long chain branching and/or intermolecular coupling. A predominance of 1,2 addition can in fact lead to crosslinking of the copolymer as found in the prior art. All of the polymers of the present invention are essentially uncrosslinked, non-gel materials.

The degree of intermolecular coupling and/or long chain branching of the polymers of the invention may vary from a copolymer composition which is substantially devoid of such branching and coupling and which behaves rheologically as linear molecules to the composition which has a high degree of long chain branching and intermolecular coupling without being crosslinked. The polymers are generally not a crosslinked product and are soluble in refluxing xylene in accordance with recognized methods. That is, substantially all of, usually greater than 98% of, the copolymers of the invention are soluble in refluxing xylene.

A better understanding of the present invention will be had by a review of the following examples taken in conjunction with the drawing figures. The best mode of the invention is described herein.

Briefly, the transition metal containing catalyst of the present invention is obtained by reacting an alumoxane and a metallocene in the presence of a solid support material. The supported reaction product can be employed as the sole catalyst component for the polymerization of olefins or, in the alternative, it can be employed with an organometallic cocatalyst.

Typically, the support can be any of the solid, particularly, porous supports such as talc, inorganic oxides, and resinous support materials such as polyolefin. Preferably, the support material is an inorganic oxide in finely divided form.

Suitable inorganic oxide materials which are desirably employed in accordance with this invention include Group 2a, 3a, 4a or 4b metal oxides such as silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the alumoxane or transition metal compound first added to the reaction solvent. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° C. to about 1000° C., and preferably, from about 300° C to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are for example, SiCl$_4$; chlorosilanes, such as trimethylchlorosilane, dimethyaminotrimethylsilane and the like. The chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably, the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent.

The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The normally hydrocarbon soluble metallocenes and alumoxanes are converted to a heterogeneous supported catalyst by depositing said metallocenes and alumoxanes on the dehydrated support material. The order of addition of the metallocene and alumoxane to the support material can vary. For example, the metallocene (neat or dissolved in a suitable hydrocarbon solvent) can be first added to the support material followed by the addition of the alumoxane; the alumoxane and metallocene can be added to the support material simultaneously; the alumoxane can be first added to the support material followed by the addition of the metallocene. In accordance with the preferred embodiment of this invention the alumoxane dissolved in a suitable inert hydrocarbon solvent is added to the support material slurried in the same or other suitable hydrocarbon liquid and thereafter the metallocene is added to the slurry.

The treatment of the support material, as mentioned above, is conducted in an inert solvent. The same inert solvent or a different inert solvent is also employed to dissolve the metallocenes and alumoxanes. Preferred solvents include mineral oils and the various hydrocarbons which are liquid at reaction temperatures and in which the individual ingredients are soluble. Illustrative examples of useful solvents include the alkanes such as pentane, isopentane, hexane, heptane, octane and nonane; cycloalkanes such as cyclopentane and cyclohexane; and aromatics such as benzene, toluene, ethylbenzene and diethylbenzene. Preferably the support material is slurried in toluene and the metallocene and alumoxane are dissolved in toluene prior to addition to the support material. The amount of solvent to be employed is not critical. Nevertheless, the amount should be employed so as to provide adequate heat transfer away from the catalyst components during reaction and to permit good mixing.

The supported catalyst of this invention is prepared by simply adding the reactants in the suitable solvent and preferably toluene to the support material slurry, preferably silica slurried in toluene The ingredients can be added to the reaction vessel rapidly or slowly. The temperature maintained during the contact of the reactants can vary widely, such as, for example, from 0° to 100° C. Greater or lesser temperatures an also be employed. Preferably, the alumoxanes and me tallocenes are added to the silica at room temperature. The reaction between the alumoxane and the support material is rapid, however, it is desirable that the alumoxane be contacted with the support material for about one hour up to eighteen hours or greater Preferably, the reaction is maintained for about one hour. The reaction of the alumoxane, the metallocene and the support material is evidenced by its exothermic nature and a color change.

At all times, the individual ingredients as well as the recovered catalyst component are protected from oxygen and moisture. Therefore, the reactions must be performed in an oxygen and moisture free atmosphere and recovered in an oxygen and moisture free atmosphere. Preferably, therefore, the reactions are performed in the presence of an inert dry gas such as, for example, nitrogen. The recovered solid catalyst is maintained in a nitrogen atmosphere.

Upon completion of the reaction of the metallocene and alumoxane with the support, the solid material can be recovered by any well-known technique. For example, the solid material can be recovered from the liquid by vacuum evaporation or decantation. The solid is thereafter dried under a stream of pure dry nitrogen or dried under vacuum.

The amount of alumoxane and metallocene usefully employed in preparation of the solid supported catalyst component can vary over a wide range. The concentration of the alumoxane added to the essentially dry, support can be in the range of about 0.1 to about 10 mmoles/g of support, however, greater or lesser amounts can be usefully employed. Preferably, the alumoxane concentration will be in the range of 0.5 to 10 mmoles/g of support and especially 1 to 5 mmoles/g of support. The amount of metallocene added will be such as to provide an aluminum to transition metal mole ratio of from about 1:1 to about 100:1. Preferably, the ratio is in the range from about 5:1 to about 50:1 and more preferably in the range from about 10:1 to about 20:1. These ratios are significantly less than that which is necessary for the homogeneous system.

The unsaturated polymers of the present invention are those having the narrow cluster index and preferably having the additional described structure of molecular weight distribution and comonomer distribution as well as properties herein described. Such polymers may be prepared by any of the known techniques of polymerization including solution, high pressure, and gasphase polymerization processes.

The polymers of the invention may be formed by use of catalyst systems of the metallocene type. That is, cyclopentadienylide catalyst systems using a metallocene complex in conjunction with an alumoxane cocatalyst or reaction product thereof are suitable for preparing polymers of the invention. The metallocene catalyst may be represented by the general formula $(Cp)_m MR_n R'_p$ wherein $C_p$ is a substituted or unsubstituted cyclopentadienyl ring; M is a Group IVB, VB, or VIB transition metal; R and R' are independently selected halogen, hydrocarbyl group, or hydrocarboxyl groups having 1-20 carbon atoms; $m=1-3$, $n=0-3$, $p=0-3$, and the sum of $m+n+p$ equals the oxidation state of M. Various forms of the catalyst system of the metallocene type may be used for polymerization to achieve polymers of the present invention including those of the homogeneous or the heterogeneous, supported catalyst type wherein the catalyst and alumoxane cocatalyst are together supported or reacted together onto an inert support for polymerization by gasphase, high pressure, or solution polymerization.

The cyclopentadienyls of the catalyst may be substituted with hydrogen or hydrocarbyl radicals. The hydrocarbyl radicals may include alkyl, alkenyl, aryl, alkylaryl, arylalkyl, and like radicals containing from about 1-20 carbon atoms or 2 carbon atoms joined together to form a $C_4-C_6$ ring.

The present invention employs at least one metallocene compound in the formation of the supported catalyst. Metallocene, i.e. a cyclopentadienylide, is a metal derivative of a cyclopentadiene. The metallocenes usefully employed in accordance with this invention contain at least one cyclopentadiene ring. The metal is selected from Group 4b, 5b and 6b metal, preferably 4b and 5b metals, preferably titanium, zirconium, hafnium, chromium, and vanadium, and especially titanium and zirconium. The cyclopentadienyl ring can be unsubstituted or contain substituents such as, for example, a hydrocarbyl substituent. The metallocene can contain one, two, or three cyclopentadienyl rings however two rings are preferred.

The preferred metallocenes can be represented by the general formulas $$(Cp)_m MR_n X_q \qquad \text{I.}$$

wherein Cp is a cyclopentadienyl ring, M is a Group 4b, 5b, or 6b transition metal, R is a hydrocarbyl group or hydrocarboxy having from 1 to 20 carbon atoms, X is a halogen, and $m=1-3$, $n=0-3$, $q=0-3$ and the sum of $m+n+q$ will be equal to the oxidation state of the metal.

$$(C_5R'_k)_g R''(C=R'_k)MQ_{3-g} \text{ and} \qquad \text{II.}$$

$$R''_2(C_5R'_k)_2 MQ.$$

wherein $(C_5R'_k)$ is a cyclopentadienyl or substituted cyclopentadienyl, each R, is the same or different and ishydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring, R'' is a $C_1$–$C_4$ alkylene radical, a dialkyl germanium or silicon, or an alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other, Q' is an alkylidiene radical having from 1 to about 20 carbon atoms, s is 0 or 1, g is 0, 1 or 2, s is 0 when g is 0, k is 4 when s is 1 and k is 5 when s is 0, and M is as defined above.

Exemplary hydrocarbyl radicals are methyl, ethyl, propyl, butyl, amyl, isoamyl, hexyl, isobuty, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred.

Exemplary hydrocarboxy radicals are methoxy, ethoxy, propoxy, butyoxy, amyloxy and the like.

Exemplary of the alkylidiene radicals is methylidene, ethylidene and propylidene.

Illustative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titaneium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titaneium methyl bromide, bis(cyclopentadienyl)methyl iodid, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bix(cyclopentadienyl)zirconium methyl iodide, bis(cyclopentadienyl)zirconium ethyl bromide, bis(cyclopentadienyl)zirconium ethyl iodide, bis(cyclopentadienyl)zirconium phenyl bromide, bis(cyclopentadienyl)zirconium phenyl iodide; the tralkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed in accordance with this invention are monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=CH$_2$ and derivatives of this reagent such as bis(cyclopentadienyl)Ti=CH$_2$.Al(CH$_3$)$_3$,(Cp$_2$TiCH$_2$)$_2$,

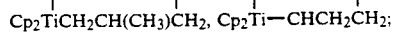
Cp$_2$TiCH$_2$CH(CH$_3$)CH$_2$, Cp$_2$Ti—CHCH$_2$CH$_2$;

substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes and the like.

Additional zirconocene catalysts useful according to the present invention include bis(cyclopentadienyl) zirconium dimethyl; bis(cycloentadienyl) zirconium dichloride, bis(cyclopentadienyl) zirconium methylchloride. Illustrative but non-limiting examples of the zirconocenes Formula II and III which can be usefully employed in accordance with this invention are, pentamethylcyclopentadienyl zirconium trichloride, pentaethylcyclopentadienyl zirconium trichloride, bis(pentamethylcyclopentadienyl)zirconium diphenyl, the alkyl substituted cyclopentadienes, such as bis(ethyl cyclopentadienyl)zirconium dimethyl, bis($\beta$-phenyl-propylcyclopentadienyl)zirconium dimethyl, bis(methylcyclopentadienyl)zirconium dimethyl, bis(n-butyl-cyclopentadienyl)zirconium dimethyl, bis(cyclohexyl-methylcyclopentadienyl)zirconium dimethyl, bis(n-octyl-cyclopentadienyl)zirconium dimethyl, and haloalkyl and dihalide complexes of the above; di-alkyl, trialkyl, tetra-alkyl, and penta-alkyl cyclopentadienes, such as bis(pentamethylcyclopentadienyl) zirconium dimethyl, bis(1,2-dimethylcyclopentadienyl)zirconium dimethyl and dihalide complexes of the above; silicone, phosphorus, and carbon bridged cyclopentadiene complexes such as dimethylsilydicyclopentadienyl zirconium dimethyl or dihalide, and methylene dicyclopentadienyl zirconium dimethyl or dihalide, and methylene dicyclopentadienyl zirconium dimethyl or dihalide, carbenes represented by the formula Cp$_2$Zr=CHP(C$_{=6}$H$_5$)$_2$CH$_3$, and derivatives of these compounds such as

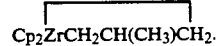
Cp$_2$ZrCH$_2$CH(CH$_3$)CH$_2$.

Bis(cyclopentadienyl)hafnium dichloride, bis(cyclopentadienyl)hafnium dimethyl, bis(cyclopentadienyl)vanadium dichloride and the like are illustrative of other metallocenes.

Preferred bridged metallocene catalysts according to the present invention include: racemic [1,1'-dimethylsilanylene-bis(3-methylcyclopentadienyl)] zirconium dichloride; [1,1'-dimethylsilanylene-bis(indenyl)] zirconium dichloride; [1,1'-dimethylsilanylene-bis(4,5,6,7-tetrahydroindenyl)] zirconium dichloride; [1,1'-(1,1,2,2-tetramethyldisilanylene)-bis(3-methylcyclopentadienyl)] zirconium dichloride; [1,1,2,2-tetramethyldisilanylene)-bis(4,5,6,7-tetrahydroindenyl)] zirconium dichloride; [1,1'-dimethylsilanylene-bis(3-trimethylsilanylcyclopentadienyl)] zirconium dichloride; [1,1'-(1,1,2,2-tetramethyldisilanylene)-bis(3-trimethylsilanylcyclopentadienyl)] zirconium dichloride; [1,1'-(1,1,3,3-tetramethyldisiloxanylene)-bis(4,5,6,7-tetrahydroindenyl)] zirconium dichloride; [1,1'-(1,1,4,4-tetramethyl-1,4-disilanylbutylene)-bis(4,5,6,7-tetrahydroindenyl)] zirconium dichloride; [1,1'-(2,2-dimethyl-2-silapropylene)-bis(3-methylcyclopentadienyl)] zirconium dichloride.

Preferred metallocene catalysts according to the present invention also include: racemic [1,1'-dimethylsilanylene-bis(3-methylcyclopentadienyl)] hafnium dichloride; [1,1'-dimethylsilanylene-bis(indenyl)] hafnium dichloride; [1,1'-dimethylsilanylene-bis(4,5,6,7-tetrahydroindenyl)] hafnium dichloride; [1,1'-(1,1,2,2-tetramethyldisilanylene)-bis(3-methylcyclopentadienyl)] hafnium dichloride; [1,1,-(1,1,2,2-tetramethyldisilanylene)-bis(4,5,6,7-tetrahydroindenyl)] hafnium dichloride; [1,1'-dimethylsilanylene-bis(3-trimethylsilanylcyclopentadienyl)] hafnium dichloride; [1,1'-(1,1,2,2-tetramethyldisilanylene-bis(3-trimethylsilanylcyclopentadienyl)] hafnium dichloride; [1,1'-(1,1,3,3-tetramethyldisiloxanylene)-bis(4,5,6,7-tetrahydroindenyl)] hafnium dichloride; [1,1'-(1,1,4,4-tetramethyl-1,4-disilanylbutylene)-bis(4,5,6,7-tetrahydroindenyl)] hafnium dichloride; [1,1,-(2,2-dimethyl-2-silapropylene)-bis(3-methylcyclopentadienyl) hafnium dichloride.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1,000 square meters per gram, preferably about 100 to 400 square meters per gram; and a pore volume of about 0.5 to 3.5 cc per gram; preferably about 0.5 to 2 cc per gram.

The polymerization may be conducted by a solution, slurry, or gas-phase technique, generally at a temperature in the range of about 0°–160° C. or even higher, and under atmospheric, subatmospheric, or superatmospheric pressure conditions; and conventional polymerization adjuvants, such as hydrogen may be employed if desired. It is generally preferred to use the catalyst compositions at a concentration such as to provide about 0.000001–0.005%, most preferably about 0.00001–0.0003%, by weight of transition metal based on the weight of monomer(s), in the polymerization of ethylene, alone or with one or more higher olefins.

A slurry polymerization process can utilize subor superatmospheric pressures and temperatures in the range of 40°–110° C. In a slurry polymerization, a suspension of solid, particulate polymer is formed in a liquid polymerization medium to which ethylene, alpha-olefin comonomer, hydrogen and catalyst are added. The liquid employed as the polymerization medium can be an alkane or cycloalkane, such as butane, pentane, hexane, or cyclohexane, or an aromatic hydrocarbon, such as toluene, ethylbenzene or xylene. The medium employed should be liquid under the conditions of the polymerization and relatively inert. Preferably, hexane or toluene is employed.

A gas-phase polymerization process utilizes superatmospheric pressure and temperatures in the range of about 50°–120° C. Gas-phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Triethylaluminum may be added as needed as a scavenger of water, oxygen, and other adventitious impurities. Polymer product can be withdrawn continuously or semi-continuing at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal. The polymer obtained can be extruded into water and cut into pellets or other suitable comminuted shapes. Pigments, antioxidants and other additives, as is known in the art, may be added to the polymer.

The molecular weight of polymer product obtained in accordance with this invention can vary over a wide range, such as low as 500 up to 2,000,000 or higher and preferably 1,000 to about 500,000.

For the production of polymer product having a narrow molecular weight distribution, it is preferable to deposit only one metallocene on to the inert porous support material and employ said support metallocene together with the alumoxane as the polymerization catalyst.

It is highly desirable to have for many applications, such as extrusion and molding processes, polyethylenes which have a broad molecular weight distribution of the unimodal and/or the multimodal type. Such polyethylenes evidence excellent processability, i.e. they can be processed at a faster throughput rate with lower energy requirements and at the same time such polymers would evidence reduced melt flow perturbations. Such polyethylenes can be obtained by providing a catalyst component comprising at least two different metallocenes, each having different propagation and termination rate constants for ethylene polymerizations. Such rate constants are readily determined by one of ordinary skill in the art.

The molar ratio of the metallocenes, such as, for example, of a zirconocene to a titanocene in such catalysts, can vary over a wide range, and in accordance with this invention, the only limitation on the molar ratios is the breadth of the Mw distribution or the degree of bimodality desired in the product polymer. Desirably, the metallocene to metallocene molar ratio will be about 1:100 to about 100:1, and preferably 1:10 to about 10:1.

The present invention also provides a process for producing (co)polyolefin reactor blends comprising polyethylene and copolyethylene-alpha-olefins. The reactor blends are obtained directly during a single polymerization process, i.e., the blends of this invention are obtained in a single reactor by simultaneously polymerizing ethylene and copolymerizing ethylene with an alpha-olefin thereby eliminating expensive blending operations. The process of producing reactor blends in accordance with this invention can be employed in conjunction with other prior art blending techniques, for example, the reactor blends produced in a first reactor can be subjected to further blending in a second stage by use of the series reactors.

In order to produce reactor blends the supported metallocene catalyst component comprises at least two different metallocenes each having different comonomer reactivity ratios.

The comonomer reactivity ratios of the metallocenes in general are obtained by well known methods, such as for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 47, 191 (1950) incorporated herein in its entirety by reference. For example, to determine reactivity ratios the most widely used copolymerization model is based on the following equations:

  (1)

  (2)

  (3)

  (4)

where $M_1$ refers to a monomer molecule which is arbitrarily designated i (where i=1, 2) and $M_i^*$ refers to a growing polymer chain to which monomer i has most recently attached.

The kij values are the rate constants for the indicated reactions. In this case, k11 represents the rate at which an ethylene unit inserts into a growing polymer chain in which the previously inserted monomer unit was also ethylene. The reactivity rates follow as: $r_1 = k_{11}/k_{12}$ and $r_2 = k_{22}/k_{21}$ wherein $k_{11}$, $k_{12}$, $k_{22}$ and 21 are the rate constants for ethylene (1) or comonomer (2) addition to a catalyst site where the last polymerized monomer is ethylene ($k_1 \chi$) or comonomer (2) ($k_2 X$).

Since, in accordance with this invention, one can produce high viscosity polymer product at a relatively high temperature, temperature does not constitute a limiting parameter as with the prior art metallocene/alumoxane catalyst. The catalyst systems described herein, therefore, are suitable for the polymerization of olefins in solution, slurry or gas phase polymerizations and over a wide range of temperatures and pressures. For example, such temperatures may be in the range of about $-60°$ C. to about 280° C. and especially in the range of about 0° C. to about 160° C. The pressures employed in the process of the present invention are those well known, for example, in the range of about 1 to 500 atmospheres, however, higher pressures can be employed.

The polymers produced by the process of this present invention are capable of being fabricated into a wide variety of articles, as is known for homopolymers of ethylene and copolymers of ethylene and higher alpha-olefins.

In a slurry phase polymerization, the alkyl aluminum scavenger is preferably dissolved in a suitable solvent, typically in an inert hydrocarbon solvent such as toluene, xylene, and the like in a molar concentration of about $5 \times 10^{-3}$ M. However, greater or lesser amounts can be used.

The present invention is illustrated by the following examples.

EXAMPLE

In the Examples following the alumoxane employed was prepared by adding 76.5 grams ferrous sulfate heptahydrate in 4 equally spaced increments over a 2 hour period to a rapidly stirred 2 liter round-bottom flask containing 1 liter of a 13.1 weight percent solution of trimethylaluminum (TMA) in toluene. The flask was maintained at 50° C. and under a nitrogen atmosphere. Methane produced was continuously vented. Upon completion of the addition of ferrous sulfate heptahydrate the flask was continuously stirred and maintained at a temperature of 50° C. for 6 hours. The reaction mixture was cooled to room temperature and was allowed to settle. The clear solution containing the alumoxane was separated by decantation from the insoluble solids.

Molecular weights were determined on a Water's Associates Model No. 150C GPC (Gel Permeation Chromatography). The measurements were obtained by dissolving polymer samples in hot trichlorobenzene and filtered. The GPC runs are performed at 145° C. in trichlorobenzene at 1.0 ml/min flow using styragel columns from Perkin Elmer, Inc. 0.1% solutions (300 microliters of trichlorobenzene solution) were injected and the samples were run in duplicate. The integration parameters were obtained with a Hewlett-Packard Data Module.

CATALYST PREPARATION

Catalyst A 10 grams of a high surface area (Davison 952) silica, dehydrated in a flow of dry nitrogen at 800° C. for 5 hours, was slurried with 50 cc of toluene at 25° C. under nitrogen in a 250 cc round-bottom flask using a magnetic stirrer. 25 cc of methyl alumoxane in toluene (1.03 moles/liter in aluminum) was added dropwise over 5 minutes with constant stirring to the silica slurry. Stirring was continued for 30 minutes while maintaining the temperature at 25° C. at which time the toluene was decanted off and the solids recovered. To the alumoxane treated silica was added dropwise over 5 minutes, with constant stirring 25.0 cc of a toluene solution containing 0.200 gram of dicyclopentadientyl zirconium dichloride. The slurry was stirred an additional ½ hour while maintaining the temperature at 25° C. and thereafter the toluene was decanted and the solids recovered and dried in vacuo for 4 hours. The recovered solid was neither soluble nor extractable in hexane. Analysis of the catalyst indicated that it contained 4.5 weight percent aluminum and 0.63 weight percent zirconium.

Catalyst B

This catalyst will demonstrate that the use of the catalyst of this invention in the production of copolyethylene with 1-butene results in the more efficient incorporation of 1-butene as demonstrated by the polymer produce density.

The procedure for the preparation of Catalyst A was followed with the exception that the methylalumoxane treatment of the support material was eliminated. Analysis of the recovered solid indicated that it contained 0.63 weight percent zirconium and 0 weight percent aluminum.

Catalyst C

The procedure for the preparation of Catalyst A was followed except that 0.300 of bis(cyclopentadienyl) zirconium dimethyl was substituted for the bis(cyclopentadienyl) zirconium dichloride. Analysis of the recovered solid indicated that it contained 4.2 weight percent aluminum and 1.1 weight percent zirconium.

Catalyst D

The procedure for preparation of Catalyst A was followed with the exception that 0.270 g of bis(n-butyl-cyclopentadienyl) zirconium dichloride was substituted for the bis(cyclopentadienyl) zirconium dichloride of Catalyst A and all procedures were performed at 80° C. Analysis of the recovered solids indicated that it contained 0.61 weight percent zirconium and 4.3 weight percent aluminum.

Catalyst E

The procedure for preparation of Catalyst D was followed with the exception that 0.250 grams of bis(n-butylcyclopentadienyl)zirconium dimethyl was substituted for the metallocene dichloride. Analysis of the recovered solid indicated that it contained 0.63 weight percent zirconium and 4.2 weight percent aluminum.

Catalyst F

The procedure for the preparation of Catalyst D was followed with the exception that .500 grams of bis(pentamethylcyclopentadienyl)zirconium dichloride was substituted for the metallocene. Analysis of the recovered solid indicated that it contained 0.65 weight percent zirconium and 4.7 weight percent aluminum.

Catalyst X 10 gms of a high surface area (Davison 952) silica, dehydrated in a flow of dry nitrogen at 800° C. for 5 hours, was slurried with 50 cc of toluene at 25° C. under nitrogen in a 250 cc round-bottom flask using a magnetic stirrer. 25 cc of methyl alumoxane in toluene (1.03 moles/liter in aluminum) was added dropwise over 5 minutes with constant stirring to the silica slurry. Stirring was continued for 30 minutes while maintaining the temperature at 60° C. at which time the toluene was decanted off and the solids recovered.

To the alumoxane treated silica was added dropwise over 5 minutes, with constant stirring 25.0 cc of a toluene solution containing 0.200 grams of bis(n-butylcyclopentadienyl) zirconium dichloride. The slurry was stirred an additional ½ hour while maintaining the temperature at 60° C. and thereafter the toluene was decanted and the solids recovered and dried in vacuo for 4 hours. The recovered solid was neither soluble nor extractable in hexane. Analysis of the catalyst indicated that it contained 4.5 weight percent aluminum and 0.63 weight percent zirconium.

The following examples show preparation of copolymers of the invention from ethylene and butadiene. Catalyst systems, especially of the metallocene/alumoxane type are effective for preparation of the polymers. A better understanding of the invention will be had by a review of the examples in conjunction with the drawing figures. The best mode of the invention now known to us is disclosed herein.

EXAMPLE 1 (DILUENT POLYMERIZATION)

A 2-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 800 cc of dry, degassed isopentane and 200 cc of purified 1,3-butadiene was injected directly into the pressure vessel. 15.0 cc of 0.785 molar (in total aluminum) methyl alumoxane in toluene was injected into the vessel by a gas tight syringe through the septum inlet and the mixture was stirred at 1,200 rpm's and 82° C. for 5 minutes at 0 psig of nitrogen. Bis(nbutylcyclopentadienyl) zirconium dichloride (3.00 mg) dissolved in 3.00 ml of dry, distilled toluene was injected through the septum inlet into the vessel. After 1 minute, ethylene at 120 psig was admitted while the reaction vessel was maintained at 82° C. The ethylene was passed into the vessel for 20 minutes at which time the reaction was stopped by rapidly venting and cooling. 33.1 gms of ethylene/-butadiene copolymer was recovered after evaporation of the liquid components under nitrogen. The polymer was analyzed by $C^{13}$NMR and it was found that for each cis 1,4 unit (cis vinylene in the chain) in the polymer, there were 0.6 of 1,2 units (pendant vinyl group on the chain); 4.7 of trans-1,4 units (trans vinylene in the chain) and 8.7 of cyclopentane rings (connected in the ethylene chain at 1,2 on the ring in a trans configuration). Other polymer attributes are summarized in the table.

EXAMPLE 1A (DILUENT POLYMERIZATION)

A 1-liter stainless pressure vessel, equipped with an incline blade stirrer, an external water jacket for temperature control, a septum inlet and vent line, and a regulated supply of dry ethylene and nitrogen, was dried and deoxygenated with a nitrogen flow. 500 cc of dry, degassed toluene and 80 cc of purified 1-hexene, and 200 cc of purified 1,3-butadiene were injected directly into the pressure vessel. 10.0 cc of 0.785 molar (in total aluminum) methyl alumoxane in toluene was injected into the vessel by a gas tight syringe through the septum inlet and the mixture was stirred at 1,200 rpm's and 70° C. for 5 minutes at 0 psig of nitrogen. Bis(n-butylcyclopentadienyl) zirconium dichloride (0.10 mg) dissolved in 0.10 ml of dry, distilled toluene was injected through the septum inlet into the vessel. After minute, ethylene at 75 psig was admitted while the reaction vessel was maintained at 70° C. The ethylene was passed into the vessel for 20 minutes at which time the reaction was stopped by rapidly venting and cooling. 15.5 gms of ethylene-1-hexene-1,3-butadiene terpolymer was recovered after evaporation of the liquid components under nitrogen. The polymer was analyzed by C13NMR and it was found that for each cis 1,4 unit (cis vinylene in the chain) in the polymer, there were 0.6 of 1,2 units (pendant vinyl group on the chain); 4.3 of trans-1,4 units (trans vinylene in the chain) and 11.3 of cyclopentane rings (connected in the ethylene chain at 1,2 on the ring in a trans configuration).

EXAMPLE 2(GAS PHASE POLYMERIZATION)

Polymerization was performed in the gas phase in a 1-liter autoclave reactor equipped with a paddle stirrer, an external water jacket for temperature control, a septum inlet and a regulated supply of dry nitrogen, ethylene, hydrogen and 1-butene. The reactor, containing 40.0 g of granular polypropylene ( 600 micron particle size) which was added to aid stirring in the gas phase, was dried and degassed thoroughly at 85° C. As a scavenger, 0.3 cc of a 20 weight percent triethylaluminum solution in hexane was injected through the septum inlet, into the vessel using a gas-tight syringe in order to remove traces of oxygen and water. The reactor contents were stirred at 120 rpm at 85° C. for 1 minute at 0 psig nitrogen pressure. 9.4 grams of 1,3-butadiene liquid was injected. 500.0 mg of Catalyst X was injected into the reactor and the reactor was pressured to 200 psig with ethylene. The polymerization was continued for 20 minutes while maintaining the reaction vessel at 85° C. and 200 psig by constant ethylene flow. The reaction was stopped by rapidly cooling and venting. 5.6 grams of ethylene-1,3-butadiene copolymer was recovered. The polyethylene was recovered by sieving out of the fraction which had a particle size greater than 350 micron diameter. The polymer was analyzed by C13NMR and it was found that for each cis-1,4 unit incorporated, there were no 1,2 units; 8 trans-1,4 units; and 14.9 cyclopentane rings (connected in the ethylene chain at 1,2 on the ring in a trans configuration.

EXAMPLE 3—POLYMERIZATION—CATALYST A

Polymerization performed in the gas phase in a 1-liter autoclave reactor equipped with a paddle stirrer, an external water jacket for temperature control, a septum inlet and a regulated supply of dry nitrogen, ethylene, hydrogen and 1-butene. The reactor, containing 40.0 g of ground polystyrene (10 mesh) which was added to aid stirring in the gas phase, was dried and degassed thoroughly at 85° C. As a scavenger, 2.00 cc of a methyl alumoxane solution (0.64 molar in total aluminum) was injected through the septum inlet, into the vessel using a gas-tight syringe in order to remove traces of oxygen and water. The reactor contents were stirred at 120 rpm at 85° C. for 1 minute at 0 psig nitrogen pressure. 500.0 mg of Catalyst A was injected into the reactor and the reactor was pressured to 200 psig with ethylene. The polymerization was continued for 10 minutes while maintaining the reaction vessel at 85° C. and 200 psig by constant ethylene flow. The reaction was stopped by rapidly cooling and venting. 12.3 grams of polyethylene were recovered. The polyethylene was recovered by stirring the product with 1 liter of dichloromethane at 40° C., filtering and washing with dichloromethane to recover the insoluble polyethylene product from the soluble polystyrene stirring aid. The polyethylene had a molecular weight of 146,000.

EXAMPLE 4—POLYMERIZATION—CATALYST A

Polymerization was performed as in Example 3 in the presence of Catalyst A except that 3.0 psig of hydrogen was pressured into the reactor prior to ethylene injection. 13.2 grams of polyethylene were recovered having a molecular weight of 29,000.

EXAMPLE 5—POLYMERIZATION—CATALYST A

Polymerization was performed as in Example 3 in the presence of Catalyst A except that 13.0 cc (0.137 moles) of 1-butene was pressured into the reactor together with the ethylene after the catalyst injection. 13.8 grams of polyethylene were recovered having a molecular weight of 39,000 and a density of 0.918 g/cc.

COMPARATIVE EXAMPLE 5A—POLYMERIZATION—CATALYST B

The polymerization was performed as in Example 5 with the exception that Catalyst B was substituted for Catalyst A. 17.3 g of polyethylene were recovered having a molecular weight of 67,000 and a density of 0.935 g/cc. The higher density as compared with that obtained in Example 5 demonstrates the less efficient incorporation of comonomer.

EXAMPLE 6—POLYMERIZATION—CATALYST C

Polymerization was performed as in Example 3 with the exception that Catalyst C was used in place of Catalyst A. 9.8 grams of polyethylene were recovered having a molecular weight of 189,000 and a density of 0.960 g/cc.

EXAMPLE 7—POLYMERIZATION—CATALYST C

Polymerization was performed as in Example 6 except that 13.0 cc of 1-butene (0.123 moles) and 0.6 psig of hydrogen (1.66 millimoles) was introduced after the catalyst together with the ethylene. 6.5 grams of polyethylene were recovered having a molecular weight of 41,000 and a density of 0.926 g/cc.

EXAMPLE 8—POLYMERIZATION—CATALYST C

Polymerization was performed as in Example 6, except that the scavenger methyl alumoxane was eliminated and no other aluminumalkyl scavenger was injected. 10.2 grams of polyethylene was recovered having a molecular weight of 120,000 and a density of 0.960 g/cc.

EXAMPLE 9—POLYMERIZATION—CATALYST D

Polymerization was performed as in Example 3 with the exception that 0.6 cc of a 25 weight percent triethylaluminum in hexane was substituted for the methylalumoxane solution of Example 1, and Catalyst D was employed in place of Catalyst A. 50.4 g of polyethylene was recovered having a molecular weight of 196,000 and a density of 0.958 g/cc.

EXAMPLE 10—POLYMERIZATION—CATALYST D

Polymerization was performed as in Example 3 with the exception that the scavenger, methylalumoxane was eliminated, Catalyst D was employed in place of Catalyst A and the polymerization was stopped at the end of 5 minutes. 28.8 g of polyethylene was recovered having a molecular weight of 196,000 and a density of 0.958 g/cc.

EXAMPLE 11-POLYMERIZATION—CATALYST E

Polymerization was performed as in Example 10 using Catalyst E with no scavenger aluminum compound. 24.0 grams of polyethylene was recovered having a weight average molecular weight of 190,000, a number average molecular weight of 76,000 and a density of 0.958 g/cc.

EXAMPLES 12—POLYMERIZATION—CATALYST F

Polymerization was performed as in Example 9 except that 500 grams of Catalyst F was substituted for Catalyst D. 8.1 grams of polyethylene was recovered having a molecular weight of 137,000 and a density of 0.960 g/cc.

The storage (G,) and loss (G") moduli of the polymers of Example 1 was measured at 150° C. and 200° C. on a Rheometrics System-Four mechanical spectrometer to determine the presence of long chain branching in the polymer composition as produced in the reactor. A one-gram (approximately) sample was washed in a dissolve and precipitate process to deash and then stabilized with 1000 ppm BHT.

Three criteria are used to decide whether a polyethylene resin contains long chain branching:

(i) Melt elasticity, which is high for long chain branched polymers and low for linear molecule polymers, was evaluated from storage moduli in the low frequency region.

(ii) Activation energy, which is about 14 Kcal/mole for long chain branched polymers and about 6 Kcal/mole for linear molecule polymers was calculated from the shifting factor of the G' and G" spectra at two different temperatures.

(iii) Thermorheological characteristics, which are complex for long chain branched polymers and simple for linear molecule polymers, were assessed by comparing the shifting factors at different frequencies (rotation).

|  | Rheological Data | | |
|---|---|---|---|
|  | Melt Elasticity | Viscous Activation Energy (Kcal/mole) | Thermo-Rheological Characterization |
| Example 1 | High | More than 10 | Complex |

The structural characterization of the polymers of the invention and the comparative product are set forth in the Table below. A review of the information and the Table discloses that the polymers of the invention have improved structural properties based upon their molecular weight distribution, and/or comonomer distribution, and/or cluster index. Furthermore, the copolymers of the invention are not gels but are boiling xylene-soluble polymers.

The polymer from Example 1 is indicated to have long chain branches including intermolecular coupling but is not crosslinked gel.

The polymers of the invention were tested for degree of unsaturation by an infrared procedure wherein concentrations of unsaturation in the ethylene-based polymers was determined by comparison of IR spectra of brominated versus original polymer specimens utilizing the following bands:

| Vinylene | 965 centimeters$^{-1}$ |
| Vinyl | 909 centimeters$^{-1}$ |
| Vinylidene | 888 centimeters$^{-1}$ |

The procedure for determination of unsaturation is known to the skilled artisan.

Thus, the present invention constitutes a method and copolymer wherein the copolymer has either no long chain branching and intermolecular coupling or a controlled degree of intermolecular coupling without forming a crosslinked product. The copolymers of the invention have significant utility in the various applications to which ethylene polymers and copolymers are customarily assigned.

TABLE

| RESIN | TYPE | COMONOMER CONTENT (MOLE PERCENT) AMOUNT | TYPE | Mw AMOUNT | Mw ($\times 10^3$) | Mw/Mn |
|---|---|---|---|---|---|---|
| EXAMPLE 1 | BUTADIENE | 1.5 | — | — | 107.4 | 2.50 |
| EXAMPLE 1A | BUTADIENE | 1.2 | HEXENE-1 | 1.9 | 161.5 | 2.00 |
| EXAMPLE 2 | BUTADIENE | 1.3 | — | — | 152.6 | 4.70 |
| 3 - EXXON LL 3001 | HEXENE-1 | 3.7 | — | — | 103.1 | 3.30 |
| 4 - DOWLEX 2045 | OCTENE-1 | 2.8 | — | — | 114.6 | 3.67 |
| 5 - EXXON LL 1001 | BUTENE-1 | 4.4 | — | — | 118.0 | 3.33 |
| 6 - DUPONT SCLAIR 11D | BUTENE-1 | 3.3 | — | — | 115.7 | 3.79 |
| 7 - MITSUI 2020L | 4-METHYL-PENTENE-1 | 3.5 | — | — | 92.3 | 2.6 |
| 8 - LLDPE[1] | BUTENE-1 | 5.2 | — | — | 96.1 | 1.78 |

| RESIN | COMPOSITION DISTRIBUTION | CLUSTER INDEX | MELTING BEHAVIOR DISTRIBUTION | PEAK M.P. (°C.) |
|---|---|---|---|---|
| EXAMPLE 1 | NARROW | 5.0 | NARROW | 114.3 |
| EXAMPLE 1A | — | 5.0 | NARROW | 104.4 |
| EXAMPLE 2 | — | 5.0 | NARROW | 115.0 |
| 3 - EXXON LL 3001 | BROAD | 12.1 | BROAD | 124.6 |
| 4 - DOWLEX 2045 | BROAD | 9.5 | BROAD | 124.3 |
| 5 - EXXON LL 1001 | BROAD | 11.7 | BROAD | 121.6 |
| 6 - DUPONT SCLAIR 11D | BROAD | 5.0 | BROAD | 118.7 |
| 7 - MITSUI 2020L | BROAD | — | BROAD | 124.5 |
| 8 - LLDPE[1] | NARROW | 9.6 | NARROW | 94.0 |

[1]LABORATORY PREPARATION WITH A SOLUBLE VANADIUM OXYCHLORIDE/ETHYL ALUMINUM SESQUICHLORIDE CATALYST.

The results given below indicate that the copolymer of Example 1 has significant long chain branching.

I claim:

1. Unsaturated copolymers the polymer chain molecules of which comprise copolymerized units of ethylene and 1,3 butadiene, a portion of the 1,3 butadiene being incorporated into the molecular backbone as trans 1,2 cyclopentane having the structure (I)

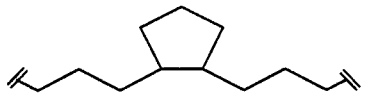

the remainder of the butadiene units being present in the copolymer backbone as units of 1,2 non-cyclic butadiene comonomer and units of 1,4 cis and trans noncyclic butadiene comonomer.

2. The copolymers of claim 1 the polymer chain molecules further comprising an olefin termonomer as a copolymerized unit incorporated into the molecular backbone.

3. The copolymers of claim 1 further characterized in that the polymer claim molecules having a molecular weight (Mn) of about 500 to about 1,000,000.

4. The copolymer of claim 1 further characterized in the polymer chain molecules contain in excess of 1 mole percent 1,3-butadiene.

5. The copolymer of claim 1 further characterized in having a cluster index of 9 or less.

6. The copolymer of claim 1 further characterized in that at least about 55 weight percent of the copolymer composition molecules have a comonomer content within about 50% of the median comonomer content in mole percent of said copolymer composition.

7. Copolymers of claim 1 further characterized by a molecular weight distribution (Mw/Mn) of about 3.0 or less.

8. Copolymers of claim 6 further characterized in that at least about 70 weight percent of the copolymer molecules have a comonomer content within about 50% of the median comonomer content in mole percent of said composition.

* * * * *